March 30, 1937.                P. SCHWARY ET AL                2,075,472
                        SPACER FOR STACKING CUT MEATS
                              Filed Feb. 28, 1936
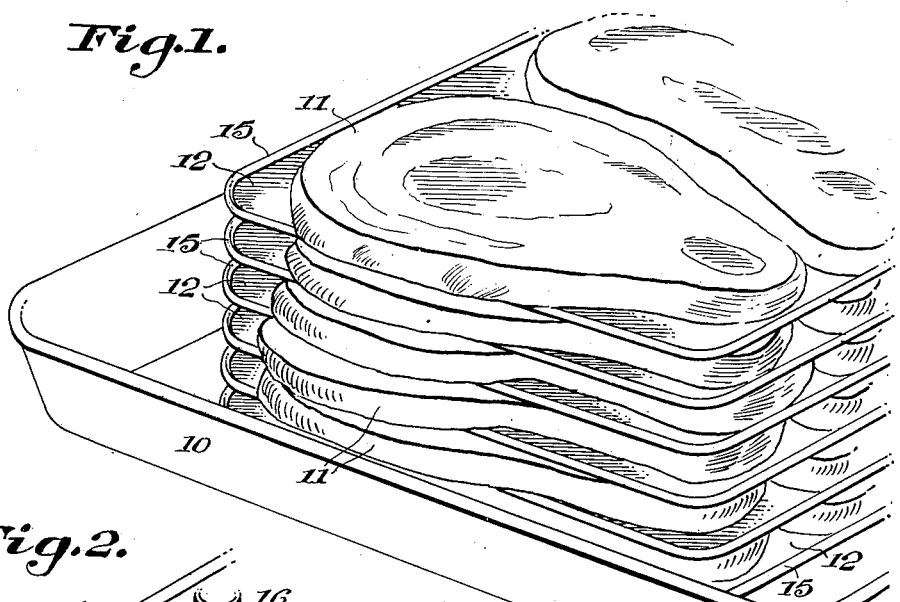
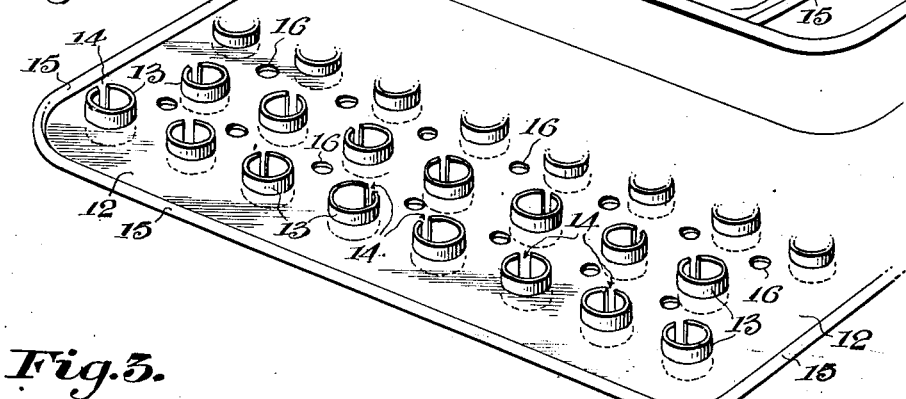
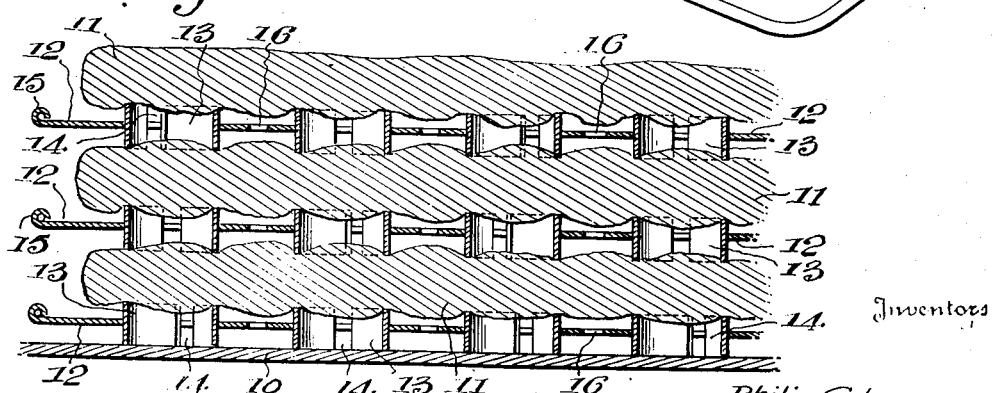
Inventors
Philip Schwary
and John G. Watson
By Myron S. Clear
Attorney Patented Mar. 30, 1937

2,075,472

UNITED STATES PATENT OFFICE 2,075,472

SPACER FOR STACKING CUT MEATS

Philip Schwary and John G. Watson, Portland, Oreg., assignors, by direct and mesne assignments, of one twenty-fifth to William F. Watson, one-fifth to Mitchell Schwary, one-fifth to Louise Gilkey, and four twenty-fifths to Mamie E. Watson, all of Portland, Oreg.

Application February 28, 1936, Serial No. 66,280

5 Claims. (Cl. 99—234)

Our present invention relates generally to devices for stacking cut steaks and other meats such as sliced ham and the like commonly displayed in meat counters with thin or tissue paper between the several cuts of meat in the stack.

In connection with red meats, the present practice of using thin or tissue paper is very objectionable since the blood from the meat quickly soaks the paper; the latter closely adheres to the meat, and the blood-soaked edges of the paper between the cuts of meat present a very undesirable appearance in the stack.

Moreover, the use of paper is very objectionable in that it practically seals the meat cuts to one another in a stack and, when a cut of meat is removed from the stack, the paper, usually torn, is many times weighed with the meat and a bad impression is created on the mind of the customer by the carelessness of a clerk.

With the above in mind, it is the object of our invention to provide a cut meat spacing device for use in stacking cut meats, which will avoid the present disadvantages; which will provide for circulation of air between the cuts in the stack; which may be readily cleaned and maintained in sanitary condition; which may be readily stripped from the cuts of meat as they are removed from the stack; which will promote a better appearance, and which will generally improve the handling of cut meats in this manner.

In the accompanying drawing, which forms a part of this specification and illustrates the best mode so far devised for carrying our invention into practical effect, Figure 1 is a perspective view illustrating the practical application of our invention.

Figure 2 is a detail perspective view of one of our sliced meat spacers, and

Figure 3 is a vertical sectional view taken through a portion of the stack shown in Figure 1.

Referring now to these figures, it is commonly the practice to display in butcher shops and the meat departments of stores, cut steaks and other meats stacked vertically in trays, as in the general manner shown in Figure 1, where the tray is shown at 10, and the successive stacked cuts of meat are indicated at 11.

The present practice of using thin or tissue paper between the meat cuts 11 is objectionable for many reasons. In the first place, the meats rapidly darken due to lack of air in the stack. Secondly, the paper absorbs blood and moisture, quickly becomes sodden and of soiled appearance, adheres to the meat cuts so that it is both tedious and difficult to remove the same, and is readily torn upon removal of the uppermost slice of the stack which adds to the already bad appearance of the paper.

In order to avoid the above disadvantages and support the sliced meat in the stack so that air may freely circulate between the slices, our invention proposes a spacer 12 consisting of a layer of thin but strong material, preferably, though not necessarily, of a transparent nature, such as celluloid or other cellulose or similar material having throughout its area a plurality of openings, and a plurality of tubular members 13 anchored intermediate their ends in the openings.

The tubular members 13, and the openings in which they are anchored, may be round, square, triangular, or of other form, the particular shape being immaterial so long as each member projects at its opposite ends at right angles to the body plane of the spacing plate 12 and projects similarly and substantially beyond the opposite faces of said plate.

Moreover, each tubular member 13 presents for its full length a slot 14 so as to provide at all times for circulation of air within the members and throughout the spaces between members when the cut meat is both above and below, closing the ends of the tubular members which thus contact the meat slices at spaced points to thus prevent discoloration of the slices of meat in a stack and permit the spacers 12 to be readily stripped from the slices as they are withdrawn from the stack.

While the particular material of which the spacer is made is not important, in certain respects it is better that it be transparent, present a readily cleanable surface, and that it be capable, as is a cellulose material, of permitting fusing of the tubular members 13 in the openings of the spacer plate to effectively and permanently anchor them in the desired relation above explained.

It is obvious that, instead of providing separate anchored tubular members 13, the spacer may have integrally molded protuberances projecting from both faces thereof and slotted as are the members 13; and that the projecting members or protuberances, as the case may be, may have more than one slot or other opening and the spacer itself may be apertured or perforated as at 16 between the members or protuberances. In any event, the spacers may have rolled, flanged or otherwise beaded edges 15 which not only strengthen the same but permit them to be more readily grasped and handled in use.

It is furthermore apparent that, unlike the paper of absorbent character usually employed, the spacer of the present invention conserves the meat juices, permitting the same to drain from any cut into the cut beneath the same.

While primarily important for use in connection with meats, it is obvious the invention may be used with fish, and, in fact, wherever it is desired to separate displayed material in the manner and for the purposes set forth.

What is claimed is:

1. A spacer for stacking meats, consisting of a thin plate-like body having a plurality of openings at spaced points therein, and tubular slotted members anchored in said openings and projecting at right angles to the plane of said plate and substantially beyond the opposite faces thereof.

2. A spacer for stacking meats, consisting of a thin plate-like body having a plurality of openings at spaced points therein, and tubular members anchored intermediate the ends thereof in said openings, said members projecting substantially beyond opposite faces of said body and having slots extending lengthwise thereof.

3. A spacer for stacking meats consisting of a thin plate-like body, of perforate, transparent material, and hollow open-ended members of similar material anchored intermediate the ends thereof in the perforations of said body plate, each of said hollow members having a slot extending the full length thereof.

4. A spacing member for interposition between cuts of meat in a vertical stack in which spacing members and meat cuts alternate, having oppositely projecting portions presenting relatively thin upper and lower edges for supporting contact at spaced points with the surfaces of meat cuts above and below the same to support such meat cuts in spaced relation, and having means providing for the circulation of air over the entire remaining surfaces of the meat cuts thus separated, whereby to avoid darkening of portions of the meat surfaces.

5. A spacing member for interposition between cuts of meat in a vertical stack in which spacing members and meat cuts alternate, having means forming a plurality of walls at right angles to the longitudinal plane of said member, the said walls presenting a plurality of relatively thin spaced apart upper and lower edges to contact meat cuts above and below said member, for holding said meat cuts separated by contact with the latter over a minimum portion of the surfaces of the meat, said walls having means providing for the circulation of air between and around said walls, to aerate and avoid darkening of the adjacent surfaces of such meat cuts as thus separated and supported.

PHILIP SCHWARY.
JOHN G. WATSON.